April 30, 1929.  V. R. MENON  1,711,360
MECHANICAL AID FOR READING AND WRITING
Filed Oct. 26, 1927   7 Sheets-Sheet 1
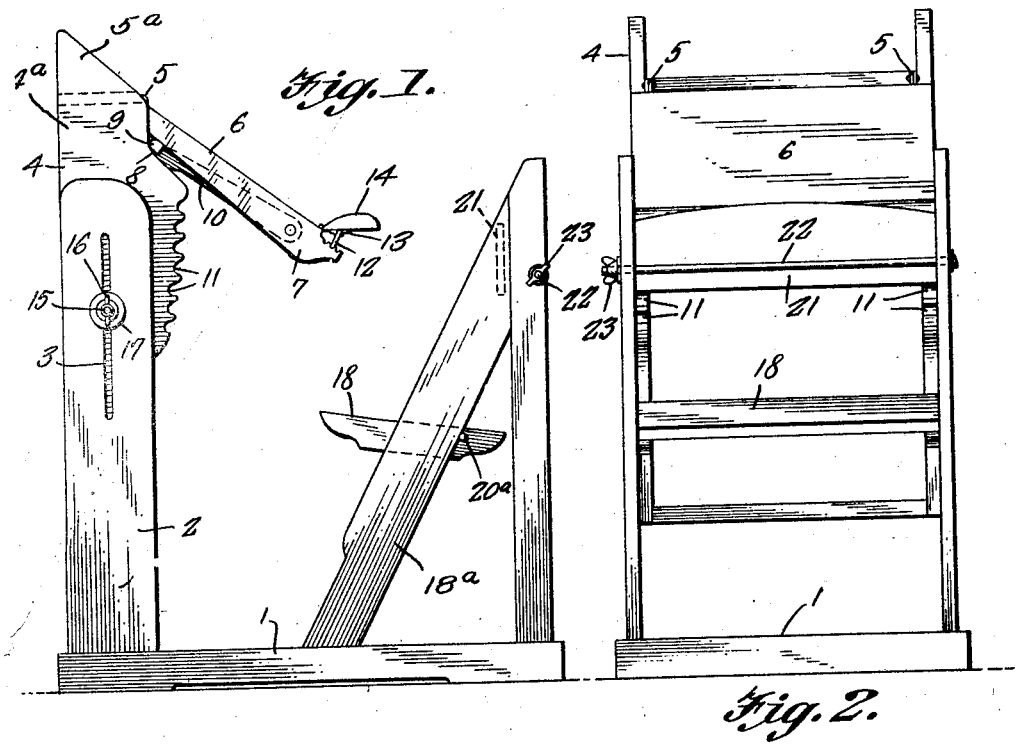
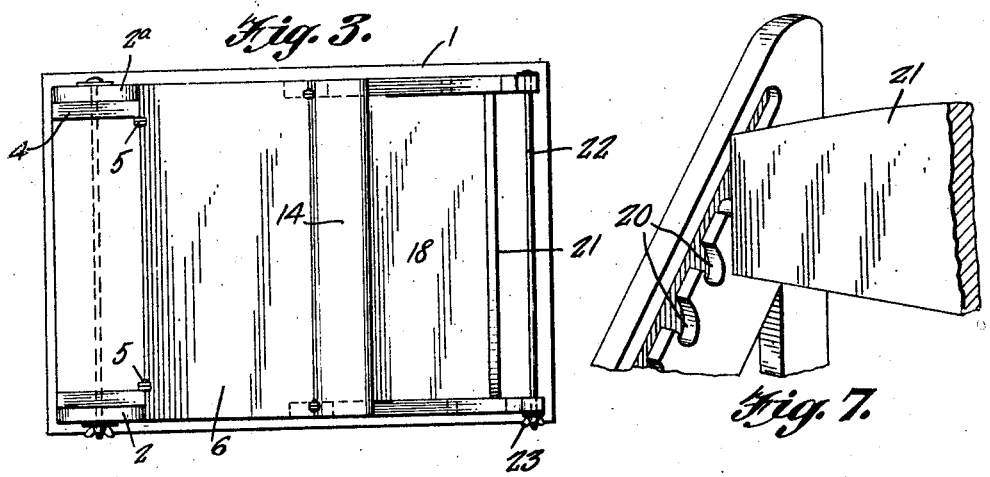

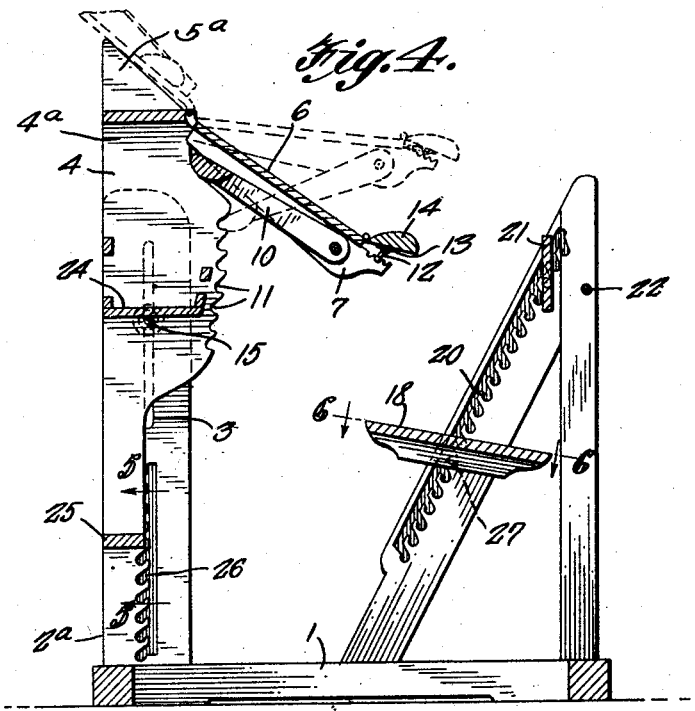
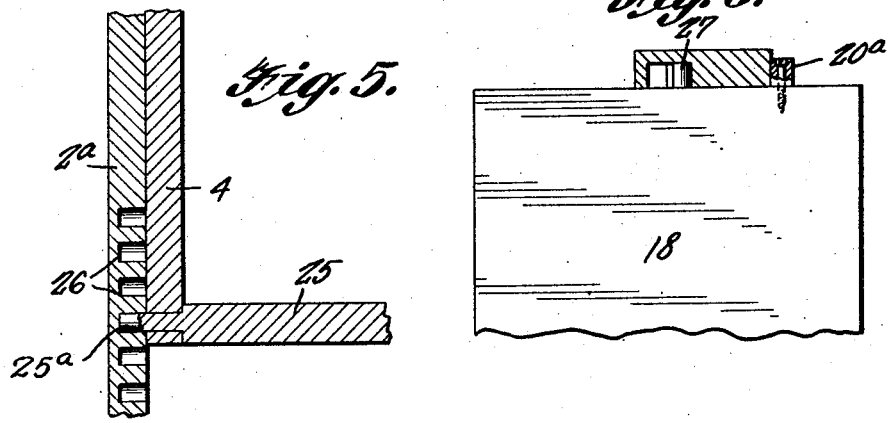

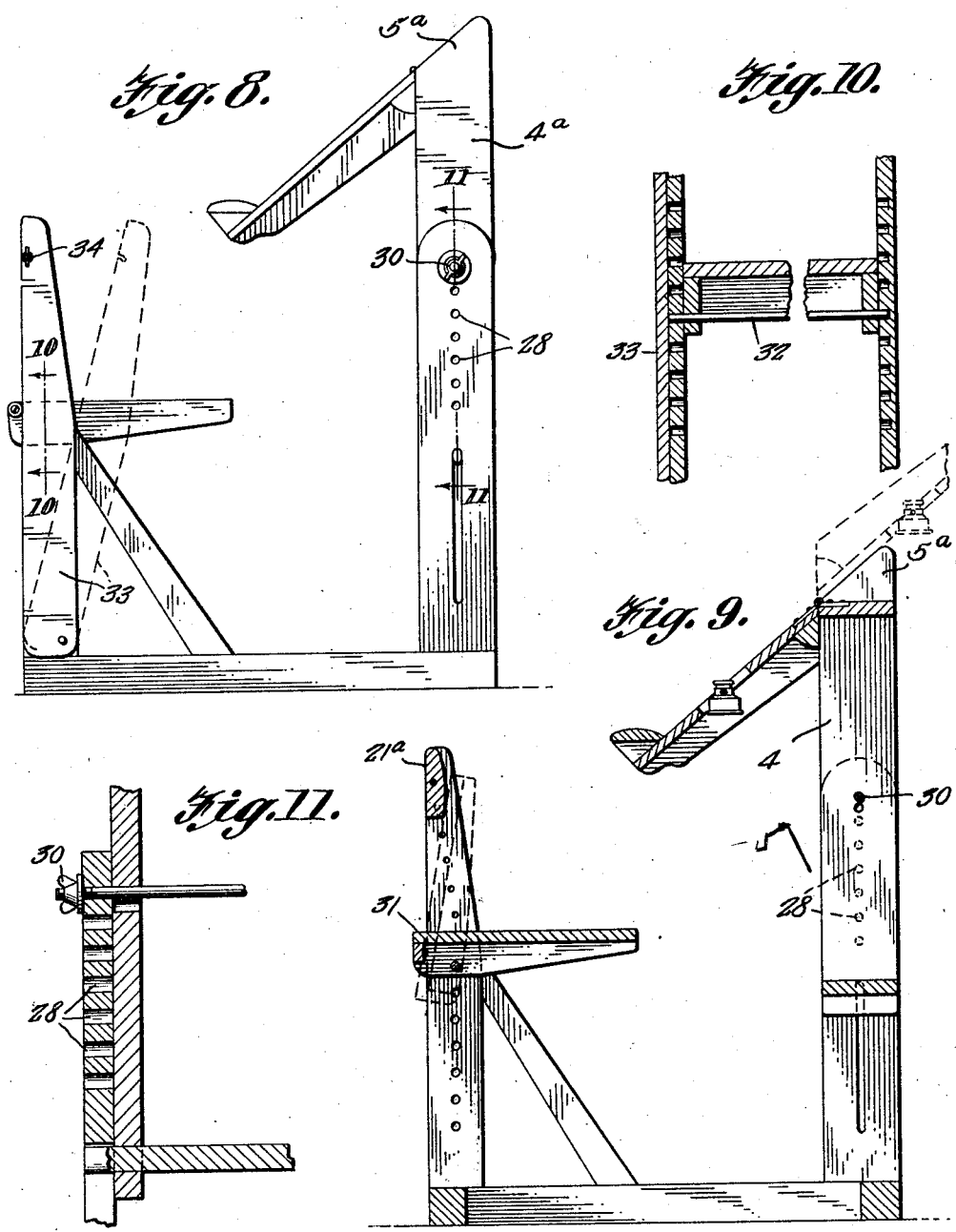

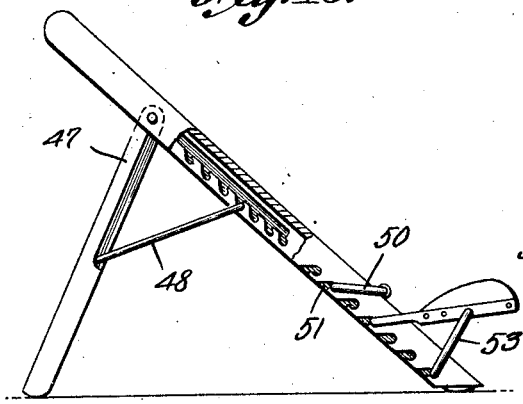
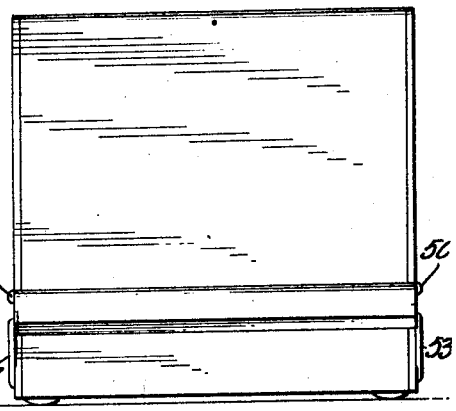
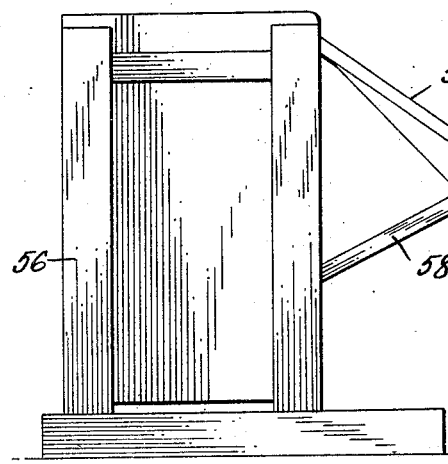
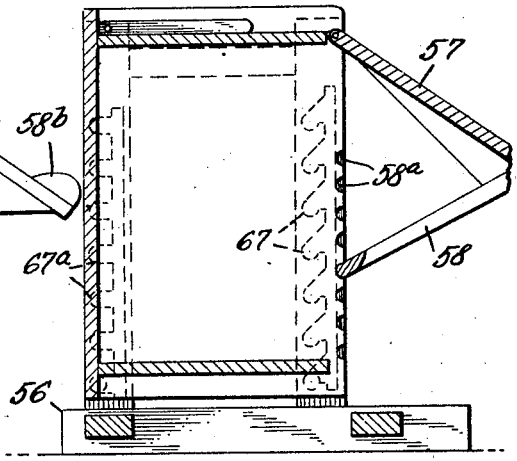

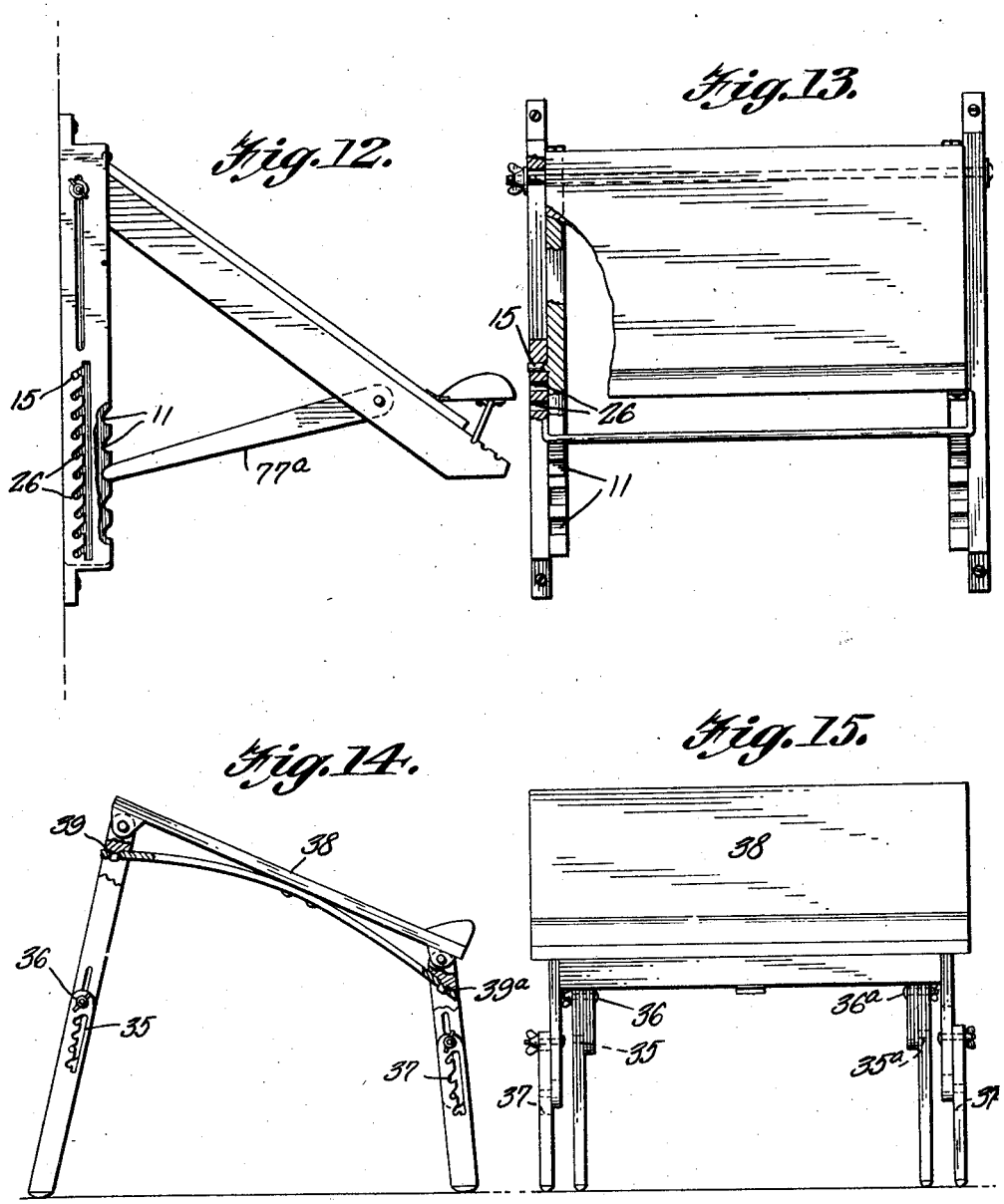

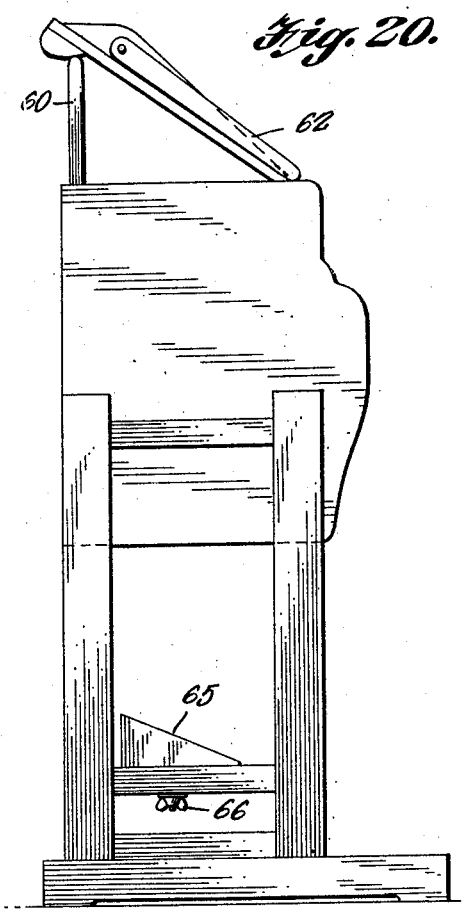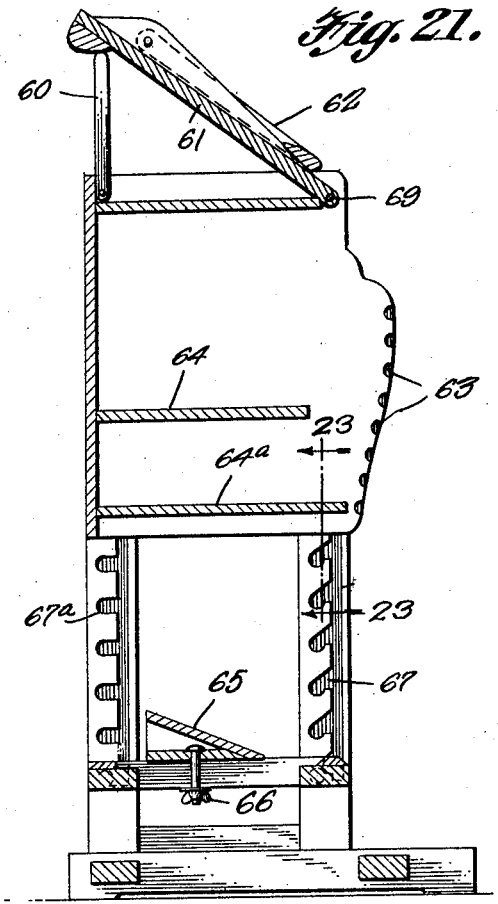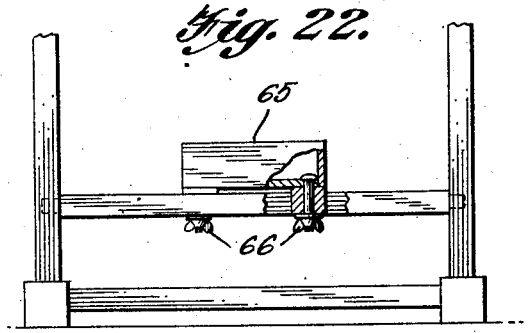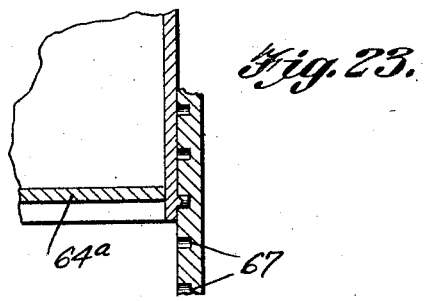

April 30, 1929.  V. R. MENON  1,711,360
MECHANICAL AID FOR READING AND WRITING
Filed Oct. 26, 1927  7 Sheets-Sheet 7
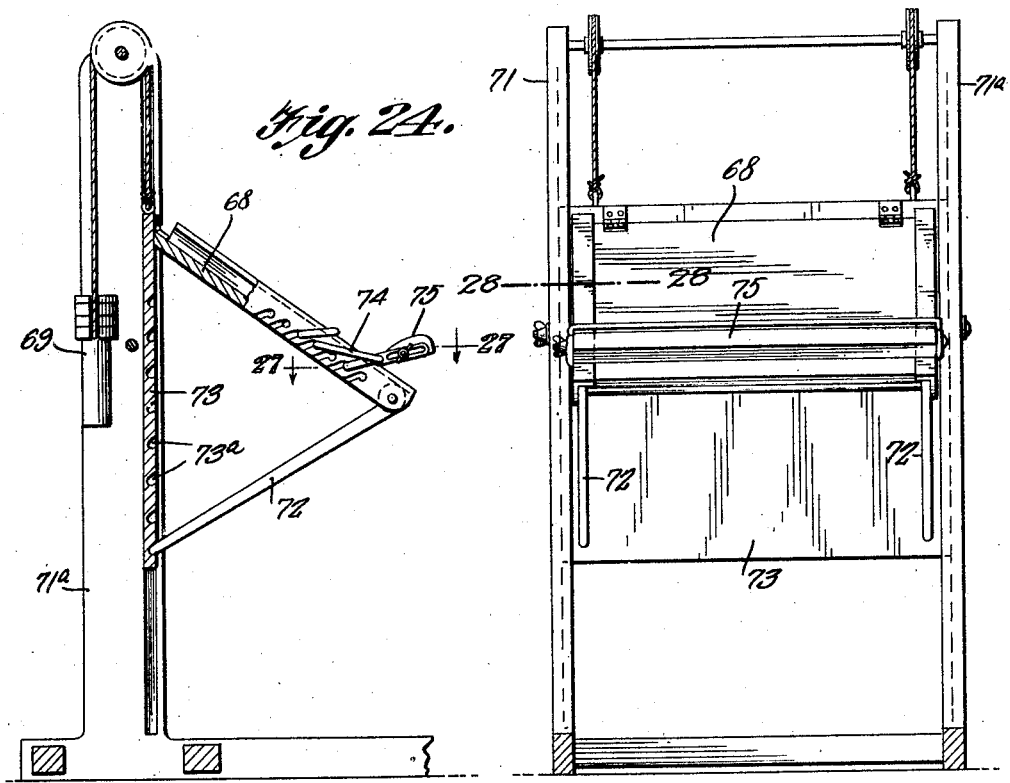
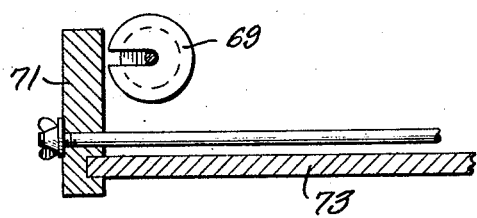
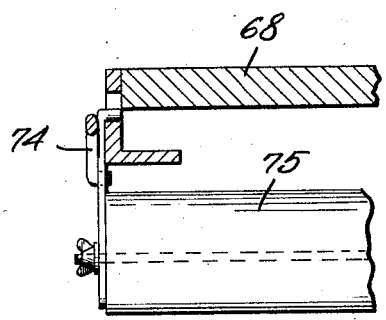

Patented Apr. 30, 1929.

1,711,360

UNITED STATES PATENT OFFICE.

VADAKKATH RAMUNNI MENON, OF SINGAPORE, STRAITS SETTLEMENTS.

MECHANICAL AID FOR READING AND WRITING.

Application filed October 26, 1927. Serial No. 228,903.

My invention relates to desks and more particularly to adjustable desks.

From long observation I have found that school pupils change the direction of the downward stroke of their pens with the shifting of the head from side to side. This shifting of the head is due to the bending posture required to gain an accurate view of the writing or other work. When one sits in an erect position with the head, neck and chest in a straight line and looks at a cup placed on a table, its rim appears elliptical while it is, in fact, a true circle. If the cup is raised and tilted towards us at a certain height and angle, the rim will appear in perspective or as a true circle. It is at this point that writing or reading is to be correctly and healthfully done.

With this in mind it is the principal object of the present invention to provide a desk which will bring the work in the correct focal plane of the user and positively cause the user to assume an erect position so that the eyes will be correctly focused on the work.

More specifically the invention provides a desk which is vertically and angularly adjustable, together with a support or arm rest for both of the arms of the user whereby the latter will be helped to remain in an upright posture while reading or writing.

The invention further provides a desk embodying a pivoted table capable of being supported in various angular positions so that it can be used by persons occupying standing or seated postures.

In the accompanying drawings illustrating my invention:—

Figure 1 represents a side elevation of a school desk and seat adapted to school work;

Fig. 2 is a front elevation of the same;

Fig. 3 is a plan;

Fig. 4 is a vertical section;

Fig. 5 is a sectional detail of the seat adjustment and taken on the line 5—5 of Figure 4;

Fig. 6 is a sectional detail in plan of the seat and taken on the line 6—6 of Figure 4;

Fig. 7 is a detail elevation of the back rest;

Fig. 8 is an elevation of a modified form of adjustment;

Fig. 9 is a median vertical section of the type of Fig. 8;

Fig. 10 is a vertical section on the plane 10—10 of Fig. 8;

Fig. 11 is a vertical section of Fig. 8 on the plane 11—11;

Fig. 12 is an elevation of a wall type of easel;

Fig. 13 is an elevation of the type of Fig 12;

Fig. 14 is a part sectional elevation of a floor type;

Fig. 15 is an elevation of the type shown in Fig. 14;

Fig. 16 is a side elevation suitable for use on a desk;

Fig. 17 is a front elevation of the latter type;

Fig. 18 is a side view of a floor type adjustable writing easel;

Fig. 19 is a sectional view of the floor type;

Fig. 20 is a side view of the type adapted for use in homes;

Fig. 21 is a vertical section of the type of Fig. 20;

Figure 22 is a view partly in section and partly in elevation of the foot rest embodied in the structure disclosed in Figure 21;

Figure 23 is a vertical section taken on the line 23—23 of Figure 21.

Fig. 24 is a cross sectional view of a bookkeeper's desk;

Fig. 25 is a front elevation of Fig. 24;

Figure 26 is a horizontal section taken on line 28—28 of Figure 25;

Fig. 27 is a transverse sectional plane of Fig. 25 taken on line 27—27 of such figures.

Referring now in particular to the drawings, I have shown therein in the several sheets a variety of useful applications of my invention all embodying one generic principle, and varying in certain specific features to adapt the invention to different occupations.

In Figs. 1 to 11 I have shown a type adapted particularly to the use of school pupils in which both the easel for writing and reading and the seat for controlling the posture of the pupil is shown as a combined unit. As shown therein 2, 2$^a$ represent a pair of standards mounted on the base 1, the standards being slotted vertically with an elongated slot to accommodate a bolt to clamp a movable support to adjust a writing tablet and plane. The slots are indicated at 3, and the adjustable support on an inner frame 4 carrying a pivotal point 5 for an inclined writing surface or table 6 supported on a pair of side rails 7 having offsets at a pivotal end and a notch 8 to accommodate rigid cross bars 9 to afford a rigid support for the writing surface. The inner frame 4 comprises a pair of vertical side bars 4ᵃ whose upper ends are inclined or bevelled as indicated at 5ᵃ. When the device is to be utilized by a person occupying a standing position, the writing surface or table is swung forwardly to lie in an inclined position against the inclined ends 5ᵃ of the bars 4ᵃ. Pivoted at their lower ends to the arms 7 are a pair of supplementary arms 10 pivoted at their lower ends and adapted to swing so as to engage any one of a series of notches 11 in the side bars of the inner frame 4. At the lower limit of the pivotal writing surface 6 is mounted pivotally an arm rest 14 carried on a metallic rod 12 pivotally supported in brackets on the underside of the arm rest and capable of swinging to engage any one of a series of notches 13 at the lower margins of the side rods of the writing plane.

It will be apparent from this construction that the writing surface 6 may be swung over an angle of 180° and may be securely supported in any of a large series of sloping positions from the horizontal, to accommodate the height of the writing surface to different heights of individuals or writers, both for reading and writing, and that the adjustable arm rest permits the writing plane to be placed in a convenient angle for writing to accommodate an easy movement of the writer's arm while following his vocation. In cooperative relation to the writing plane I provide an adjustable seat 18 which may be mounted on the inclined support 18ᵃ. The seat is vertically adjustable in a series of notches 20 and has two fixed lugs 20ᵃ on the rear side adapted to engage the inclined seat support to form a fixed point for the seat and render it stable in any position of adjustment. The seat carries a pair of pivots 27 (see Fig. 6), mounted in a transverse plane to engage any of the several notches, thereby permitting it to be shifted out therefrom, and moved into engagement with any one of the long series of notches 20 indicated in the drawings, Fig. 4, and when occupied by the sitter the fixed lugs 20ᵃ on the seat preferably covered with rubber secure it against yielding. Evidently by adjustment in any of the several notches the height of the seat may be regulated to suit the age and height of the individual so as to bring his eyes on a focal plane suitable for writing or reading of a book or the like supported on the plane 6. 22 represents a bolt extending transversely through the side posts of the seat frame and capable of being locked in a position by a wing nut 23. I provide also a tiltable back rest 21 capable of being adjusted to different vertical positions in any of the notches 20 and which affords a yielding tiltable support for the sitter's back enabling the person to assume comfortable postures with reference to the writing surface. Across the end posts of the adjustable stand for the writing plane is a movable shelf 24 capable of being locked in engagement with a series of transverse bars on the standard side-rails, or by bringing it into close relation to the clamped bolt 15 extending through the side rail. At 26 is shown a vertical series of slots to accommodate pins 25ᵃ formed on the ends of a cross beam 25 carried by the lower end of the adjustable frame 4. By moving the cross bar forwardly it may be adjusted in any vertical relation carrying with it the writing stand, and by pressing rearwardly will drop into one of the slots 26 and be securely retained, when the wing nut cooperating with the bar 25 may be tightened rendering the adjustment perfectly secure.

In Figs. 8 to 11 is shown a modification of the mode of mounting and rendering adjustable the writing plane. As shown therein a lock bolt and wing nut 30 are provided similarly to the construction already described, but in lieu of the notches heretofore described, I provide a series of holes 28 to accommodate the bolt, and at the bottom is a vertical slot on each side rail to accommodate a transverse bolt at the bottom. The construction of the writing plane is similar in all respects to that hereinbefore described. The specific mode of supporting the adjustable seat is similar in general arrangement, but comprises a rod 32 insertable through a pair of holes in the main side rails and capable of being locked in position by a pivoted bar, 33, on the outside which swings over the latter series of holes and is locked in adjusted position by a latch 34 at the top. The seat is adjustable to any one of the series of holes in the side rail to accommodate the supporting rod 32, and a tiltable backrest 21ᵃ may be modeled similar to 21 heretofore described.

As has been already said, the writing plane for use by a writer need not necessarily be a part of a cabinet or desk but may be entirely portable or may be mounted on the wall or other vertical surface in such a form as indicated in Figs. 14 and 16. In Figs. 14 and 15 are shown a type adapted for use on the floor. It comprises two pairs of sectional legs, pivoted together to form a quadrangular base. The lower sections of the legs are slotted longitudinally as indicated at 35, 35ᵃ to accommodate adjusting bolts 36, 36ᵃ, etc., with accompanying wing nuts to enter and lock the sections together in any pair of a plurality of vertical recesses 37, 37ᵃ forming part of or attached to the lower sections of the leg. The lower legs are slotted similarly to Fig. 1, and a bolt passing through the outer one within the slot is clamped by a lock nut to permit each leg to be adjustable.

A pivotal writing plane 38 mounted on side rails, as indicated in Fig. 14 carries a flexible rod fixed thereon at the under side capable of being sprung and latched in holes in the legs as indicated at 39, 39ª, etc. Evidently the lower leg sections may be shifted to raise or lower the plane 38 to suit the visual range of the writer.

An arm rest mounted near the lower edge of the writing surface may be fixed or adjustable as hereinbefore described. By this means the slope of the writing surface may be varied over a wide angle to accommodate the movements of the writer's arm, and the double adjustment affords means for accommodating a writer who desires to conduct his writing or reading at the floor lever which is a customary condition in India.

A further modification of the portable form of the writer's aid is indicated in Figs. 16 and 17. As herein shown the main plane carries a pivoted arm 47 capable of adjustment to various slopes by a rod 48 pivoted thereon and engaging on a right angled terminal any one of a plurality of longitudinal notches formed in a slot or in an attached casting in the side of the plane. A lower series of notches 51 carries a pivoted bar 50, the upper main stem of which is shod with a vulcanized rubber tube to constitute a book rest for reading purposes. Near the lower edge is pivoted an angular rod 53 capable of being shifted to any one of a plurality of notches to obtain various slopes of the arm rest. The upper edge of the rod 53 has angular terminals engaging any one of a series of holes along the outside of the rail carrying the arm rest. This form is well adapted to a desk use or may be used in conjunction with a portable seat of general construction such as that hereinbefore described.

In Figs. 20 to 27 I have shown a form of the invention adapted to a home use, which embodies the same general principles hereinbefore described of rendering the focal plane of the writing or reading matter vertically adjustable to suit the eyes of the individual case, and is adapted to a sitting or standing posture. As herein shown a pivotal plane surface as for instance a board is pivotally mounted at its lower edge on a movable inner section of a cabinet having a plurality of horizontal shelves 64, 64ª to accommodate heavy books and the like. Fixed on the plane surface 61 is a pair of rails in which is pivoted a pair of bars 62 near the upper edge of the plane with respect to the pivotal point 69, said arms having terminals adapted to cooperate with any one of a series of notches 63 in vertical alignment on the sides of the movable section thereby permitting the writing surface to have an arm rest similar to the construction hereinbefore described at its under surface, thus either the upper surface or the lower surface may be used for writing, standing or sitting. The pivoted surface is supported by a pair of pivoted rods 60 giving it a stable support; when swung around over an angle of 180°, when, the under surface comes on top to form the active writing surface, and the pivoted arms 62 are opened and lodged securely in some one of the vertical series of notches 63. The arm rest may be pivotally mounted as hereinbefore described so as to swing over an angle suitable for convenient use by a writer either in the position shown in Fig. 21 or in a downward position when the writer is seated. The desk is adjustable in height in a vertical plane by movement vertically and the insertion of transverse bolts, such as hereinbefore described, to lodge in some one of the series of notches 67 with cooperating transverse bolts nested in the recesses 67ª. A transversely adjustable foot rest 65 secured by a vertical bolt and wing nut 66 constitutes an adjustable foot rest for the writer or reader.

In Figs. 24 to 27 is shown a form of bookkeeper's desk in which the stand is vertically movable with the assistance of a pair of counter weights as 69, 69ª passing over pulleys at the top of the side bars 71, 71ª and carrying a slide 73 on which is pivoted at its top an adjustable writing plane as indicated at 68 carrying a pair of pivotal props 72 capable of engaging any one of a series of transverse notches 73 in the adjustable slide. A pivoted arm rest 75 is provided on its lower sides with a pair of angular ends which engage notches in the side bars of a pivoted brace 74. By slotting the side bars of the plane the arm rest 76 is rendered extensible, and permits it to form a support for a large, heavy record, such as a ledger or the like resting on the inclined writing plane. A brace 74 pivoted in the side arms and hooked by the angular extremities into the side rails of the frame adds strength to the structure.

In Figs. 12 and 13 is shown a wall type adapted to be secured on a wall of a room. The structure is essentially the same as the type above described having a slot in the side outside rails, permitting the pivotal end of the plane to be raised and lowered vertically and to be propped at any angle in notches 11 by props as 77ª. Notches 26 accommodate a bolt 15 carried by the inner movable member to be shifted in slots on the outer stationary walls and dropped into the bottom of the notches to lock in the adjusted position; a bolt and wing nut in an upper slot of the outer side walls steady and lock the cabinet in any adjustment.

Figs. 18 and 19 show a floor type; a stationary base 56 permits the inner adjustable member to be raised and supported adjustably to a desired level by notches 67, 67ª forming an anchorage for a transverse bolt and the pivotal writing plane 57 carrying pivoted props 58 engaging notches 58ᵃ permits any slope of the plane, and an arm rest 58ᵇ to accommodate the arm comfortably while writing.

I would have it understood that while having described herein a number of specific forms by which the invention may be carried out, I am not limited to any particular form of the invention, as I consider it new with me to provide a system which admits of an easy posture for a writer or reader while engaged in his occupation, and adapts the focal plane of the writing or reading matter to be conveniently adjustable to his range of sight. Moreover, I consider it novel with me to provide an adjustable arm rest by which fatigue of the writer may be negatived during protracted sessions at his occupation.

Having thus described my invention, what I claim as new and desire to secure by Letters Patent is:—

1. A writer's aid comprising a vertically adjustable support, a pivoted plane surface adapted for writing, said plane being adjustable to variable fixed inclinations to a horizontal, an arm rest on the lower edge adjustable at variable fixed angles above and below the plane of the writing surface, said plane for the writing being reversible over an angle of 180° to render either plane surface available for writing on different levels as when standing or sitting.

2. A desk comprising a support, an inclined table carried thereby, and an arm rest carried by the lower end of the table and extending horizontally and being of sufficient length to accommodate both arms of the user, the arm rest having an upper surface of substantial width whereby to support the arms of the user and cause such user to assume an erect position.

3. In a desk, a support, a table pivotally connected thereto and normally extending downwardly and forwardly therefrom, means connecting the table and support for permitting the table to rest against the support in an inclined position whereby to support the forearm of the human body while in a standing posture, and means for supporting the table at various positions to one side of the support to support the forearm while the human body is in a seated posture.

4. In a desk, a support, a table pivotally connected thereto and normally extending downwardly and forwardly therefrom, means connecting the table and support for permitting the table to rest against the support in an inclined position whereby to support the forearm of the human body while in a standing posture, means for supporting the table at various positions to one side of the support and an arm rest carried by the lower edge of the table to support the forearm while the human body is in a seated posture.

5. In a desk, a support having an inclined upper end, a table pivotally attached thereto adjacent such upper end to swing about a horizontal axis and adapted to rest in an inclined position against the inclined upper end, and means whereby to support the table to one side of the support when desired.

6. In a desk, a support having an inclined upper end, a table pivotally attached thereto adjacent such upper end to swing about a horizontal axis and adapted to rest in an inclined position against the inclined upper end, and arm rests secured to the opposite faces of the table at its opposite ends, one of which being adapted to abut the support to rigidly support the table in an inclined position at one side of the support.

7. A desk comprising a support, an inclined table carried thereby, an arm rest adjustable about a horizontal axis at the lower end of the table and extending horizontally and being of sufficient length to accommodate both arms of the user, the arm rest having an upper transversely convex surface which forms a substantially horizontal support for the arms regardless of the adjustment of such arm rest.

8. A desk comprising a support, a vertically adjustable inclined table carried thereby, an arm rest carried by the lower end of the table and extending horizontally and being of sufficient length to accommodate both arms of the user, and means for adjusting the arm rest towards and away from the inclined table.

9. A writer's aid comprising a cabinet with an outer section designed to rest on the floor, an inner movable section adjustable to different heights for writing, a plane writing surface mounted thereon to support the writing material and adjustable to different inclinations from the horizontal plane to focus the material to the writer's eye, and an arm rest adjustable to various fixed angles relative to the various positions of the plane writing surface to hold the writer's arms in proper position and thereby render the writer's vision accurate when writing.

10. A desk comprising a support, an inclined table carried thereby, and an arm rest carried by the lower end of the table and extending horizontally and being of sufficient length to accommodate both arms of the user, the arm rest being fixed against lateral movement relative to the table and having an upper surface of substantial width whereby to support the arms of the user and cause such user to assume an erect position.

11. A desk comprising a support, a vertically adjustable inclined table carried thereby, an arm rest having an upper curved surface of substantial width carried by the lower end of the table and extending horizontally and being of sufficient length to accommodate both arms of the user.

12. A desk for reading and writing comprising a work-supporting member, means for adjusting said member to various heights and slopes to bring the work into correct focal relationship to the eyes of the user, and a transverse ledge having an upper surface of substantial width, said ledge extending transversely along the lower edge of the work-supporting member and adapted to form an arm rest and being of sufficient length to support both the arms of the user and assist the body of the user to remain in an upright position while reading and writing.

13. A desk comprising a support, an inclined table carried thereby, and an arm rest adjustable about a horizontal axis at the lower end of the table and extending horizontally and being of sufficient length to accommodate both arms of the user, the arm rest being fixed against lateral movement relative to the table and having an upper surface which forms a substantially horizontal support for the arms regardless of the adjustment of such arm rest.

14. In combination with an inclined table, an arm rest carried by the lower end of the table and extending horizontally and being of sufficient length to accommodate both arms of the user, the arm rest having an upper surface of substantial width whereby to support the arms of the user and cause such user to assume an erect position, said arm rest being bodily adjustable along the upper surface of the table toward or from the upper end thereof, and means for holding the same in various adjusted positions.

15. In combination with an inclined table, an arm rest carried by the lower end of the table and extending horizontally and being of sufficient length to accommodate both arms of the user, the arm rest having an upper surface of substantial width whereby to support the arms of the user and cause such user to assume an erect position, said arm rest being bodily adjustable along the upper surface of the table toward and from the upper end thereof, means for holding the same in various adjusted positions, and a support arranged beneath the table and pivotally connected thereto adjacent its upper end for supporting the same in an inclined position.

In testimony whereof I affix my signature.

VADAKKATH RAMUNNI MENON.